3,235,782
MOTOR CONTROL SYSTEM AND MAGNETIC
AMPLIFIER THEREFOR
Frank Alan Manners, Cleveland, Charles Allan Schurr, Warrensville Heights, and Gerald T. Johnston, Bedford Heights, Ohio, assignors to Square D Company, Park Ridge, Ill., a corporation of Michigan
Filed Sept. 25, 1961, Ser. No. 140,515
9 Claims. (Cl. 318—229)

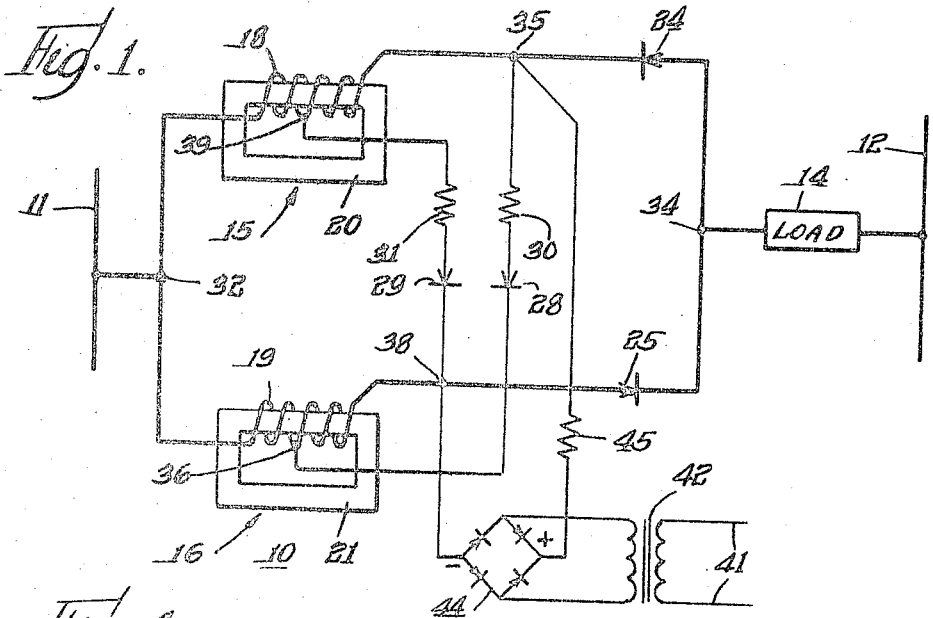
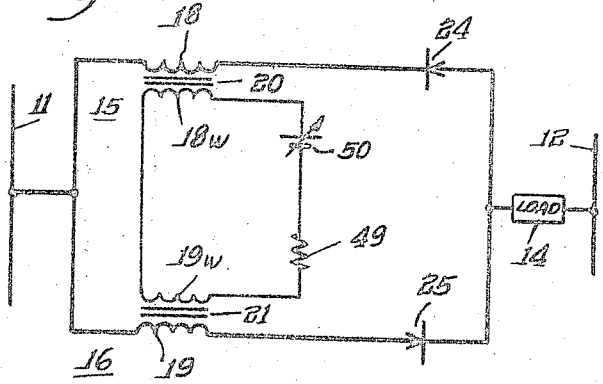
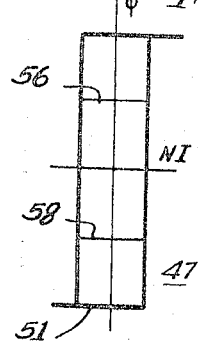
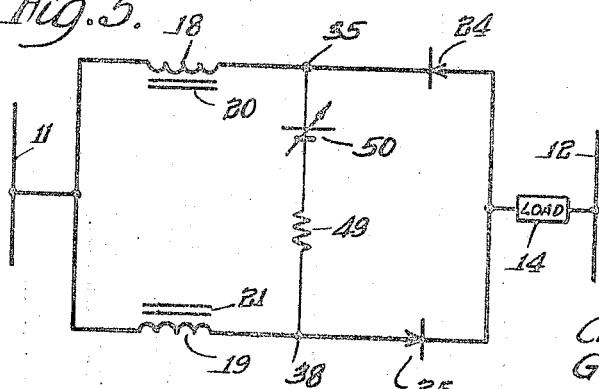
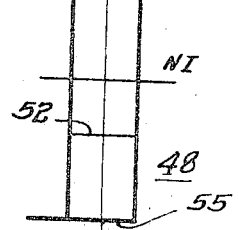
INVENTORS
Frank Alan Manners
Charles Allan Schurr
Gerald T. Johnston INVENTORS.
Frank Alan Manners
Charles Allan Schurr
Gerald T. Johnston
By: Harold J. Rathbun Atty.

This invention relates to magnetic amplifiers and more particularly to a self-saturating magnetic amplifier especially suitable for controlling the magnitude and direction of the torque of a polyphase motor driving a crane hoist mechanism.

Heretofore, the magnitude and direction of the torque of polyphase induction motors subject to overhauling loads, such as crane hoist loads, have been controlled by the interposition of saturable reactors or saturable transformers, or both, in the primary circuits for the motors. These prior saturable devices include direct current control windings which add to their complexity and physical size and also require relatively complex control circuitry. Because crane hoists require that substantially full voltage be applied to the motor during hoisting operations, saturable devices for such service should have very low impedances when in the saturated state. This necessitates that the load or gate windings be wound inside of the control windings thereby reducing thermal efficiency and resulting in relatively large and costly structures. In addition, the prior saturable devices are relatively sluggish in response and often require the use of anti-hunt circuitry.

The use of faster responding magnetic amplifiers of the prior art, i.e., saturable reactors with control windings combined with self-saturating diodes, in place of the simpler saturable reactors or saturable transformers in crane hoist controllers has heretofore been unsatisfactory and expensive because in certain instances the rectifiers of the magnetic amplifiers must withstand relatively large reverse voltages. Furthermore, although the prior magnetic amplifiers provide a relatively good ratio of response time to control power, they require additional bias supplies to turn them off and tend to have relatively high voltage drops across them when fully conductive. In the magnetic amplifier of this invention, the inverse voltages on the rectifiers are so low that inexpensive rectifiers can be used, the voltage drop at full conduction is relatively low, and the control circuitry is simple with negligible loss in response time.

It is an object of this invention to provide an improved self-saturating magnetic amplifier.

Another object is to provide an improved magnetic amplifier suitable for controlling the direction of phase rotation and the magnitude of the voltage applied to the primary of a polyphase motor.

Another object is to provide an improved magnetic amplifier having a relatively fast response time and requiring relatively little control power.

Another object is to provide an improved magnetic amplifier suitable for controlling the direction and magnitude of the torque of a polyphase induction motor which amplifier is characterized by being simple to manufacture, small in physical size, and applicable to a wide range of motor sizes.

Another object is to provide an improved magnetic amplifier which does not require an external bias supply.

Another object is to provide an improved static motor control system that is easy to service and economical to manufacture.

Another object is to provide an improved static hoist control system that can be installed with only a few uncomplicated adjustments and readily maintained with conventional techniques and instruments and by personnel without special training.

Other objects and advantages will be apparent from the following description wherein reference is made to the drawings, in which:

FIG. 1 is a wiring diagram of a magnetic amplifier in accordance with this invention;

FIGS. 2 and 3 are idealized hysteresis loops for illustrating the operation of the amplifier of FIG. 1;

FIGS. 4 and 5 are wiring diagrams for explaining the operation of the amplifier of FIG. 1.

Figure 6:
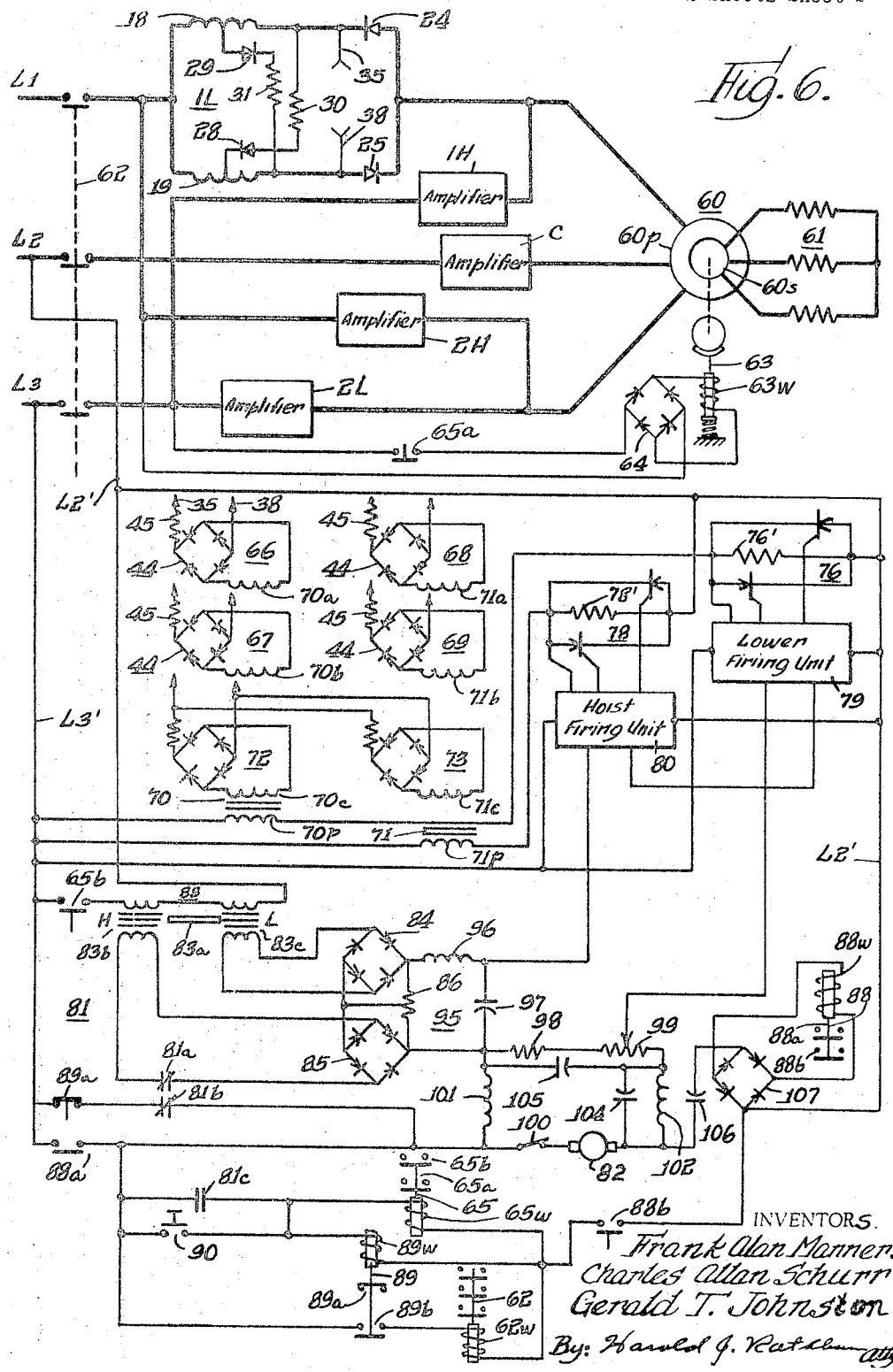
FIG. 6 is an elementary wiring diagram of a crane hoist controller incorporating magnetic amplifiers in accordance with FIG. 1.

Referring to FIG. 1, a magnetic amplifier 10 in accordance with this invention and connected to control the flow of alternating current from a single-phase source indicated by the conductors 11 and 12 to a load 14 comprises a pair of saturable reactors 15 and 16 having gate windings 18 and 19 wound on closed cores 20 and 21, respectively, a pair of load rectifiers 24 and 25, a pair of biasing or control rectifiers 28 and 29, and a pair of resistors 30 and 31. The windings 18 and 19 and the rectifiers 24 and 25 are connected in series with each other in a closed-loop circuit with the rectifiers 24 and 25 poled in the same direction about the loop and next adjacent to each other in the loop.

A terminal 32 is on the loop intermediate of the windings 18 and 19 and a terminal 34 is on the loop intermediate of the rectifiers 24 and 25. As illustrated, the source conductor 11 is connected to the terminal 32 and the terminal 34 is connected to one side of the load 14, the other side of which is connected to the source conductor 12.

A terminal 35 on the loop between the winding 18 and the rectifier 24 is connected through a biasing circuit including the resistor 30 and the rectifier 28 to an intermediate tap 36 on the winding 19, and a terminal 38 on the loop between the winding 19 and the rectifier 25 is connected through a biasing circuit including the rectifier 29 and the resistor 31 to an intermediate tap 39 on the winding 18.

A unidirectional control potential, obtained from an alternating current source 41 through a transformer 42, a full-wave rectifier 44, and a resistor 45 is applied across the terminals 35 and 38. With the rectifiers 24, 25, 28, and 29 poled as indicated, the negative output terminal of the rectifier 44 is connected to the terminal 38.

The theory and operation of the circuit of FIG. 1 will be explained with reference to the idealized hysteresis loops of FIGS. 2 and 3 and the wiring diagrams of FIGS. 4 and 5. A hysteresis loop 47 of FIG. 2 is for the core 20 of the reactor 15 and a hysteresis loop 48 of FIG. 3 is for the core 21 of the reactor 16. In FIG. 4 the control and biasing circuit elements of FIG. 1 have been omitted and control windings 18$w$ and 19$w$ added for the cores 20 and 21, respectively. The windings 18$w$ and 19$w$ are connected in a closed loop circuit with a resistor 49 and a source of variable undirectional voltage indicated as a battery 50.

It will be assumed that the core 20 in FIG. 4 has been previously saturated so that its flux is at the lower saturation level 51 on the hysteresis loop 47, that the flux in the core 21 is at some intermediate level such as the level 52 on the hysteresis loop 48, and that operation begins at the start of a half-cycle of positive voltage at the conductor 11. As this half-cycle of voltage builds up, current flowing through the winding 19 and the rectifier 25 causes the flux in the core 21 to move from the level 52 toward an upper saturation level 53 of the hysteresis loop 48. A voltage is thereby induced in the control winding 19w in such a direction as to be additive with the voltage of the battery 50, and a small magnetizing current flows in the control winding 18w. The voltage applied to the control winding 18w is equal to the induced voltage in the control winding 19w plus the voltage of the battery 50 and less the voltage drops in the control loop circuit including the windings 18w and 19w, the resistor 49 and the battery 50. The voltage of the battery 50 is adjusted to be less than the voltage drops in the control loop so that the voltage across the control winding 18w is only slightly less than the induced voltage in the control winding 19w. As a result of the changing flux in the core 20 caused by the voltage across the winding 18w, a voltage is induced in the winding 18 which, assuming identical ratios of transformation, is slightly smaller than the voltage acros the winding 19. During this initial portion of the cycle, the rectifier 25 is conducting the magnetizing current in the winding 19. An examination of the voltages around the loop including the windings 18 and 19 and the rectifiers 24 and 25 shows that the reverse voltage on the rectifier 24 is relatively low.

At an indefinite point later in the cycle, the winding 19 can no longer support a voltage since the flux in the core 21 reaches the saturation level 53 on the hysteresis loop 48, whereupon a current of large magnitude flows through the winding 19 and the rectifier 25 for the remainder of the half-cycle. During this latter interval, there is no flux change in the core 21 and, therefore, no voltage is induced in the control winding 19w so that only a small voltage from the battery 50 less voltage drops appears across the winding 18w. Again, it is seen that only a low reverse voltage appears across the rectifier 24. It is to be understood that the magnitude of the voltage of the battery 50 may be adjusted to equal or exceed the voltage drops in the control loop circuit thereby to prevent the cores 20 and 21 from reaching their saturation levels during the conducting half cycle of their windings.

During the next half cycle when the conductor 12 is positive, the rectifier 24 and the load winding 18 will be the conducting elements and during this period the reverse voltage across the rectifier 25 will be low.

The foregoing analysis shows that under certain assumed conditions the rectifiers 24 and 25 in the circuit of FIG. 4 are not subjected to the supply voltage, but only to a voltage dependent on the control voltage which is relatively low. In a circuit such as that of FIG. 4, however, initial transient conditions can cause higher voltages to occur and therefore load rectifiers of higher voltage rating must be used.

If the turns of the windings 18 and 19 are equal to the turns of the windings 18w and 19w, respectively, the windings 18w and 19w may, in effect, be superimposed upon the gate windings 18 and 19 by applying the control voltage directly to the windings 18 and 19 as in FIG. 5. The control windings 18w and 19w are therefore eliminated. The operation of the circuit of FIG. 5 will be explained by first considering a half-cycle during which the supply conductor 11 is positive, and by assuming the voltage of the battery 50 to be zero and the cores 20 and 21 to be initially saturated at levels 51 and 55, respectively, on their hysteresis loops. During the first half-cycle, the flux in the core 21 moves from the lower saturation level 55 to the upper saturation level 53 and the winding 18 carries a magnetizing current from left to right as viewed in FIG. 5 through the battery 50, the resistor 49, and the rectifier 25. The voltage drop across the coil 18 is smaller than that across the coil 19 because of the additional voltage drops in its circuit. Consequently, the flux excursion in the core 20 is less than that in the core 21 and can be indicated as being from the lower saturation level 51 to a level 56. During the next half-cycle of voltage, the flux change in each of the cores reverses direction. Because of the voltage drop in the resistor 49 caused by the magnetizing current of the winding 19 during the second half-cycle, the flux in the core 21 will not change as rapidly as that in the core 20. Because the core 20 began the second half-cycle at the intermediate flux level 56 along its hysteresis loop 47, it will return to the lower saturated condition at 51 before the end of the second half-cycle. When the core 20 becomes saturated at the level 51, the flux in the core 21 will be at a level such as the level 52 and a large load current will flow in the winding 18 with the voltage drop across the winding 18 substantially zero. There is now no voltage impressed across the winding 19 so that the flux in the core 21 ceases to change during the remainder of the second half-cycle. Its flux can be assumed to have remained at the level 52. During the next half cycle a similar action occurs except that the core 21 goes into saturation at the level 53 sooner than during the previous half-cycle and the flux in the core 20 moves only to a level 58. During later half-cycles, a similar action occurs and the cores 20 and 21 saturate for a progressively longer portion of each cycle. The result is that during each cycle the periods during which the flux levels are changing become shorter while the periods of load current flow become longer. The process continues until both cores are fully saturated at all times with the flux in the core 21 at the level 53 on its hysteresis loop 48 and the flux in the core 20 at the level 51 on its hysteresis loop 47.

Thus, under steady state conditions and with the perfect hysteresis loops assumed, the amplifier of FIG. 5 reaches, after initial transient condition, a fully conducting condition if the control voltage is zero and the resistor 49 has a resistance greater than zero. If the resistance of the resistor 49 is also reduced to zero, the flux changes in each of the cores during successive cycles soon reset the fluxes so that neither core saturates during the conducting half-cycle of its winding and the amplifier becomes substantially switched OFF. With zero control circuit resistance and with no control voltage input, it should be noted that the circuit of FIG. 5 reduces to two parallel connected reactors.

In practice, core materials with the assumed characteristics are not available and amplifiers such as that illustrated in FIG. 5 are not at full output with a value of control resistance greater than zero but require a voltage input of the polarity indicated to cause full output. Similarly, a voltage input of the opposite polarity is required to turn the amplifier off. Thus, it will be seen that a control voltage input of one polarity switches the amplifier ON while a control voltage of the opposite polarity switches it OFF.

From the foregoing, it is seen that with no control voltage between the terminals 35 and 38, if the system of FIG. 5 starts in a fully switched-off condition, it will gradually within a few cycles become partially switched on.

The idealized amplifier of FIG. 5 is in a partial condition of conduction even when the control voltage of the battery 50 is zero. To simplify the control circuits, it is desirable to have the amplifier normally biased to an OFF condition when the control voltage is zero. This is accomplished in accordance with this invention by the addition of the control circuits including the rectifiers 28 and 29 and the resistors 31 and 30, as shown in FIG. 1.

Referring again to FIG. 1, the off-bias circuits, comprising the resistors 30 and 31 and the rectifiers 28 and 29, are operative only when the power is applied. The control signal voltage should be applied to the amplifier before the main power is applied so that there is always a small switching-on signal present. This signal ensures that the flux in the core 20 will be further toward the lower end of its hysteresis loop than the flux in the core 21. The off-bias circuits are adjusted to overcome this minimum control signal voltage when power is applied to the amplifier 10.

In the operation of the circuit of FIG. 1, when the conductor 11 is positive, line voltage is applied to the winding 19 and the flux in the core 21 moves toward the upper end of its hysteresis loop 48. For the amplifier 10 to be switched off, the flux in the core 20 should move in the same direction at the same rate. By means of the off-bias circuits, the voltage across the winding 19 is applied to less than the full winding 18, i.e., from the terminal 32 to the tap 39, so that flux in the core 20 also moves toward the upper end of its hysteresis loop 47. The magnetizing current in the winding 18 passes through the resistor 31 producing a voltage drop across the resistor 31. To be exactly switched off, the rate of change of flux in the two cores 20 and 21 should be the same, and therefore the voltage across each of the windings 18 and 19 should be the same. If the off-bias resistor 31 is correctly adjusted, the voltage drop across the resistor 31 is equal to the voltage induced across the right hand portion of the winding 18. A similar effect happens with the aid of the resistor 30 in its off-bias circuit during the following half-cycle. Increasing the resistance of the resistors 30 and 31 causes the amplifier 10 to be partially switched on. Decreasing the resistance of the resistors 30 and 31 tends to drive the amplifier 10 past the shut-off point.

With the off-bias circuits adjusted as just described, the amplifier is switched off with no voltage at the terminals 35 and 38 from the source 41. As soon as a control voltage appears across these terminals, the amplifier 10 switches on to a degree proportional to the voltage as explained with reference to FIG. 5.

One of the advantages of the amplifier 10 of FIG. 1 is that the voltage across the amplifier when it is fully switched on can be kept to a low level without expensive winding arrangements. In fact, a considerable saving is achieved by virtue of the fact that no control windings are needed. This means that less copper is required and consequently less iron per amplifier than would otherwise be the case. The use of two simple cores in place of a large multi-legged core assembly simplifies mounting and handling problems.

It is desirable in hoist control applications to have negative current-feed-back in the primary circuit amplifiers to insure adequate current balance between the phases. To accomplish this with conventional magnetic amplifier arrangements, it is necessary to add external circuitry. Current feed-back is present in the amplifier 10 of FIG. 1 because the voltage drops caused by the resistance of the load windings upon load current flowing through them oppose the control signal voltage.

In order to attain fast response with prior art saturable devices, large amounts of control power are required. The amplifier of this invention provides, with very low control power, the desired fast repsonse thereby eliminating the disadvantages accompanying the use of control power of large magnitude and rendering expensive anti-hunt circuits unnecessary.

The off-bias circuits are operative only when the main power is applied, thereby allowing a small turning-on presetting signal to be supplied during the absence of the main power. This signal presets the cores 20 and 21 to a condition which prevents transient voltages from appearing across the rectifiers 24 and 25 thereby to permit the use of inexpensive rectifiers of low inverse voltage rating.

In the wiring diagram of FIG. 6, electromagnetic devices are shown with their windings and contacts physically associated and in some instances the contacts are also shown in convenient locations in the diagram in the circuits they control. Referring to FIG. 6, a polyphase induction motor 60 for driving a hoist mechanism (not shown) has a secondary winding 60s connected to a Y-connected slip resistor bank 61 and has a primary winding 60p connected to a source of polyphase power indicated by the conductors L1, L2, and L3 through main contacts of an electromagnetic contactor 62 and a plurality of magnetic amplifiers like the magnetic amplifier 10 of FIG. 1 and identified in FIG. 6 as 1L, 2L, 1H, 2H and C. The amplifiers are so interposed in the connections to the primary winding 60p that when the amplifiers 1L, 2L, and C are switched on, the flux field in the motor 60 rotates in a downward direction whereas when the amplifiers 1H, 2H and C are switched on, the flux field in the motor 60 rotates in the hoisting direction. Only one of the amplifiers in FIG. 6 is shown in detail, but it will be understood that the other amplifiers are identical and all are like the amplifier 10 of FIG. 1.

A spring-applied, electromagnetically-released, friction brake 63 for the motor 60 has an operating winding 63w supplied from a full-wave rectifier 64 arranged to be connected between the conductors L1 and L3 by a normally-open contact 65a of a brake relay 65 also having a normally open contact 65b and an operating winding 65w.

Control voltages for the amplifiers 1L, 2L, 1H, and 2H are obtained from power supplies 66, 67, 68, and 69, respectively, each of which includes one of the rectifiers 44 and one of the resistors 45 of FIG. 1. The resistors 45 may be the readily adjustable type if desired. The power supplies 66 and 67 include secondary windings 70a and 70b, respectively, of a transformer 70 having a primary winding 70p; and the power supplies 68 and 69 include secondary windings 71a and 71b, respectively, of a transformer 71 having a primary winding 71p. Control voltage for the amplifier C is obtained from a pair of similar power supplies 72 and 73 connected in parallel and including secondary windings 70c and 71c, respectively, of the transformers 70 and 71, respectively.

Energization of the primary winding 70p is preferably controlled by a pair of controlled rectifiers 76 and energization of the primary winding 71p is preferably controlled by a pair of controlled rectifiers 78. As shown, the rectifiers 76 are connected in inverse parallel relation in series with the winding 70p across control supply conductors L2' and L3', which are connected to the conductors L2 and L3, respectively. Similarly, the rectifiers 78 are connected in inverse parallel relation in series with the winding 71p across the conductors L2' and L3'. The rectifiers 76 and 78 are, in turn, controlled by a "lower" firing unit 79 and a "hoist" firing unit 80, respectively. In order to insure that the amplifiers 1L, 2L, 1H, 2H, and C are properly reset before power is applied to them, resistors 76' and 78' are connected in parallel with the pairs of rectifiers 76 and 78, respectively, thereby to permit a small presetting voltage to be impressed across each of the pairs of terminals 35 and 38. It will be understood that the resistors 30 and 31 in each of the amplifiers 1L, 2L, 1H, 2H, and C will be adjusted so that upon closure of the contactor 62 with the presetting voltage applied, each will be in its off condition.

The firing units 79 and 80 are responsive to a combined speed and direction reference signal voltage obtained from a reversing master switch 81 and a feed-back voltage signal obtained from a tachometer generator 82 driven by the motor 60.

The reference signal voltage is derived from an induction unit 83 forming part of the master switch 81 and operated by a rotating handle (not shown) of the master switch. The unit 83 comprises a magnetic vane 83a which is moved by the handle selectively within the air gaps of two transformers 83b and 83c and so arranged that roation of the master switch handle in one direction from a neutral position will produce a gradually increasing voltage in one secondary winding and a gradually decreasing voltage in the other, while a rotation in the other direction will cause the converse relationship of voltages. The primary windings of the transformers 83b and 83c are connected across the conductors L2' and L3' in series with the contacts 65b of the brake relay 65 and the secondary windings are connected to bridge rectifiers 84 and 85, respectively, whose outputs are connected in opposition so that a differential voltage signal appears across a resistor 86 interconnecting a positive terminal of the rectifier 84 with a positive terminal of the rectifier 85 and having an intermediate tap connected to the negative terminals of the rectifiers 84 and 85.

The master switch 81 also includes a pair of normally closed contacts 81a and 81b and a normally open contact 81c all operative upon movement of the handle of the master switch 81. The contact 81b opens when the handle of master switch 81 is moved to any operating position, but the contact 81a remains closed except when the handle of the master switch is positioned for operation of the motor 60 at full speed in the lowering direction. The contact 81b, when closed, completes a circuit to an under-voltage relay 88 having an operating winding 88w and normally open contacts 88a and 88b. The contact 81a, when closed, completes the connection between the secondary of the transformer 83b and the rectifier 85. The contact 81c controls the brake relay 65 and a time delay relay 89 having an operating winding 89w and a slow-to-close normally-closed contact 89a and a slow-to-open normally-open contact 89b. There is also provided, preferably in the operating handle of the master switch 81, a normally-open push button 90.

A filter network 95 comprising a reactor 96 and a capacitor 97 is used to filter the reference voltage appearing across the resistor 86. It will be seen that the magnitude of this voltage is a function of the position of the vane 83a while the polarity of this voltage is dependent upon the direction of movement of the vane 83a from its neutral position.

The feed-back signal voltage which originates in the tachometer generator 82 is impressed across a pair of series-connected resistors 98 and 99 through a circuit including a normally-closed overspeed switch 100 and a pair of reactors 101 and 102. A capacitor 104 is connected in parallel with the reactor 102 and a capacitor 105 is connected in parallel with the resistors 98 and 99.

The feed-back signal voltage which appears across the resistors 98 and 99 is in series with the reference signal voltage across the capacitor 97. The algebraic sum or net of these two signal voltages is applied to the inputs of the hoist and lowering firing units 79 and 80. As shown, these inputs are in series.

There are provided a continuity sensing circuit which carries an alternating current to check circuit continuity through the tachometer generator 82 and the overspeed switch 100. The alternating current path can be followed from the conductor L3' through the contacts 89a and 81b or the undervoltage relay contact 88a, the overspeed switch 100, the tachometer generator 82, a capacitor 106, and a rectifier 107 to the conductor L2'. The winding 88w is connected across the direct current terminals of the rectifier 107 and may, if desired, have conventional overload relay contacts in series therewith. The reactors 101 and 102 prevent the alternating current continuity signal from entering the control circuits of the firing units 79 and 80, and the capacitor 106 prevents the direct current output from the tachometer generator 82 from entering the continuity checking circuit. It will be seen that unless the circuit through the tachometer generator 82 and the overspeed switch 100 is continuous, it is impossible to close the undervoltage relay 88, and, if the relay 88 is closed, discontinuity in this circuit causes the relay 88 to drop out, thereby stopping the motor 60. It should be noted that the presence of the continuity signal improves the reliability of the circuit since the occurrence of a discontinuity such as an open collector shoe or tachometer brush will cause the full alternating current control voltage to appear across the discontinuity and thereby tend to keep the circuit continuous.

The purpose of the time delay relay 89 is to cause power to be maintained on the motor 60 until the drive has come to rest upon return of the handle of the master switch 81 to the neutral position from either operating position. Braking is thus provided by both the friction brake 63 and the electrical braking forces of the motor 60. The push button 90 associated with the master switch 81 by-passes the contact 81c to allow the motor 60 to be energized when the master switch 81 is in the neutral or off position with the friction brake 63 released. As mentioned, the contact 81a of the master switch 81 which is connected in series with the secondary of the transformer 83b is arranged to open when the handle of the master switch 81 is moved to its extreme lowering position. Thus, as soon as the handle of the master switch 81 reaches this position, only a rectified signal from the transformer 83c is impressed across the capacitor 97, this signal being of sufficient magnitude to overcome the feed-back signal and cause the lowering firing unit 79 to turn on fully, thereby producing full output through the magnetic amplifiers 1L, 2L, and C. The motor then is excited with lowering phase rotation so as to cause even a light load to be driven downwardly near synchronous speed and an overhauling load to be lowered regeneratively. This operation results in reduced motor current when lowering an overhauling load, as compared to the current which would flow when lowering the same load by counter-torque.

Upon the initial movement of the handle of the master switch 81 into the hoisting position, a reference signal is impressed across the capacitor 97. This signal turns on the hoist firing unit 80 and causes the controlled rectifiers 78 to conduct so as to turn on the amplifiers 1H, 2H, and C by increasing the control voltage across their respective pairs of terminals 35 and 38. The contact 81c, upon closure, energizes the relays 65 and 89. Power is then applied to the amplifiers by closure of the contactor 62 upon energization of the winding 62w as a result of closure of the contact 89b. It will be noted that inasmuch as a presetting control voltage is provided to the amplifiers by conduction through the resistors 76' and 78', there is always a control voltage on the amplifiers at the time the contactor 62 closes.

When the motor 60 starts to rotate in the hoist direction, the tachometer generator 82 produces a feed-back voltage signal. This feed-back signal opposes the reference signal from the induction unit 83 and the net signal controls the hoist firing unit 80. The output of the hoist firing unit 80 is thereby maintained at a value causing the voltage applied to the motor terminals to establish a motor torque sufficient to hoist the load at a speed determined by the position of the handle of the master switch 81. The speed of the motor stabilizes when the signals from the induction unit 83 and the tachometer generator 82 effectively combine to indicate to the firing units that the motor is operating at the desired speed and in the desired direction.

If, while hoisting at full speed, the reference signal is reduced, the feed-back signal is momentarily maintained. Because of this, the effective or net signal to the lower firing unit 79 and the hoist firing unit 80 is suddenly reversed in polarity. This causes a turning off of the hoist firing unit 80 and a turning on of the lower firing unit 79, thereby reversing the phase rotation of the voltages applied to the terminals of the motor 60 because of changes in impedance of the amplifiers 1H, 2H, 1L, and 2L. The motor 60 slows down until the feed-back signal reduces to a value less than the reference signal. At this time, the polarity of the net signal again reverses causing the hoist firing unit 80 to be turned on and the lower firing unit 79 to be turned off, causing the phase rotation of the voltage at the motor 60 to reverse again to produce hoisting torque.

The handle of the master switch 81 can be placed in a position so as to hold stationary any loads within the rating of the drive with the friction brake 63 released. This floating of the load is accomplished by reducing the reference signal so that the voltage applied to the motor 60 and the torque of the motor are maintained at values causing the hoisting torque of the motor to equal exactly the downward pull of the load. Under such conditions, the tachometer generator 82 produces no signal and the hoist rectifier control unit responds to the reference signal output of the master switch 81 alone.

Upon movement of the master switch 81 into the intermediate lowering positions, operation similar to that just described for hoisting occurs except that the amplifiers 1L and 2L respond initially to cause the motor 60 to exert torque in the downward direction. If the load on the motor 60 is overhauling, the feedback signal exceeds the reference signal, and the amplifiers 1L and 2L are automatically turned off and the amplifiers 1H and 2H are turned on to cause the motor 60 to exert a torque in the hoisting direction thereby to lower the overhauling load at a preset speed by counter-torque. If the master switch 81 is moved to the extreme lowering position, the contact 81a is opened to provide driving down or regenerative torque at the motor 60 as described hereinbefore.

Having thus described our invention, we claim:

1. A motor control system and motor combination comprising an alternating current motor, a normally open switch, a self-saturating magnetic amplifier the impedance of which depends upon the magnitude of a control voltage impressed thereon, means connecting the switch and amplifier in series between a source of power and the motor, whereby upon closure of the switch the amplifier and motor are connected in series to the source of power, means operable to impress said control voltage on said amplifier, and control means for insuring that said last named means is rendered operative to impress a predetermined value of said control voltage on said amplifier before closure of said switch, and characterized in that said amplifier includes self-biasing means for biasing said amplifier to a non-conductive condition upon closure of said switch with said predetermined value of control voltage impressed thereon, and further characterized in that said amplifier has a pair of load windings and a pair of rectifiers connected in series therewith, respectively, the self-biasing means include a first circuit interconnecting the end of one winding nearest its series-connected rectifier with a point intermediate the ends of the other winding, and a second circuit interconnecting the end of the other winding nearest its series-connected rectifier with a point intermediate the ends of said one winding.

2. A motor control system and motor combination comprising an alternating current motor, a normally open switch, a magnetic amplifier the impedance of which depends upon the magnitude of a control voltage impressed thereon, means connecting the switch and amplifier in series between a source of power and the motor, whereby upon closure of the switch the amplifier and motor are connected in series to the source of power, means operable to impress control voltages of adjustable magnitude on said magnetic amplifier, and control means for insuring that said last named means is rendered operative before closure of said switch to impress a control voltage of relatively small magnitude on said amplifier tending to turn on said amplifier on, and self-biasing means for said amplifier operative upon closure of said switch to prevent turning on of said amplifier, characterized in that said amplifier has a pair of load windings and a pair of rectifiers connected in series therewith, respectively, the self-biasing means include a first circuit interconnecting the end of one winding nearest its associated rectifier with a point intermediate the ends of the other winding, and a second circuit interconnecting the end of the other winding nearest its associated rectifier with a point intermediate the ends of said one winding.

3. In a motor control system, a plurality of magnetic amplifiers; each amplifier comprising a pair of saturable reactors each having a winding on a saturable core, means connecting the windings in parallel with each other to define a first circuit having two branches, a pair of rectifiers in said branches, respectively, poled to permit alternate half-waves of alternating current to flow through said first circuit with half-waves of one polarity flowing in one branch and half-waves of the other polarity flowing in the other branch, a second circuit interconnecting said windings and operative when a half-wave of current is flowing through one of said branches and causing a flux change in the core associated with said one branch to permit a current to flow in only a fractional portion of the winding in the other branch, thereby to change the flux in the core associated with said other branch a like amount, and a third circuit separate from the second circuit and operative when a half-wave of current is flowing through the other of said branches causing a flux change in the core associated with said other branch to permit a current flow in only a fractional portion of the winding in said one branch, thereby to change the flux in the core associated with said one branch a like amount; means for impressing a variable unidirectional control voltage across said branches of each amplifier to determine the period during each half-cycle that the cores are saturated; a polyphase induction motor; means interposing said amplifiers between a source of polyphase power and said motor in a manner to control the direction of torque of said motor upon selective saturation of said amplifiers; and means for controlling the control voltage impressing means to vary the speed and direction of torque of said motor.

4. A motor control system and motor combination comprising an alternating current motor, a normally open switch, a full-wave self-saturating magnetic amplifier the impedance of which depends upon the magnitude of a control voltage impressed thereon, said amplifier having a pair of load windings and pair of rectifiers connected in series therewith, respectively, and poled to permit alternate half-waves of alternating current to flow therethrough, respectively, means connecting the switch and amplifier in series with each other between a source of power and the motor, whereby upon closure of the switch the amplifier and motor are connected to the source of power means, operable to impress said control voltage on said amplifier, and control means for insuring that said last named means is rendered operative before closure of said switch to impress a control voltage of relatively small magnitude on said amplifier tending to turn said amplifier on, self-biasing means for biasing said amplifier to a non-conductive condition upon closure of said switch, said self-biasing means including a first circuit interconnecting the end of one winding nearest its series-connected rectifier with a point intermediate the ends of the other winding, and a second circuit interconnecting the end of the other winding nearest its series-connected rectifier with a point intermediate the ends of said one winding.

5. A magnetic amplifier comprising a pair of saturable reactors and a first and a second rectifier connected in series with each other in a closed loop with the rectifiers poled in the same direction about the loop and next adjacent to each other in the loop, a first terminal on the loop intermediate of the reactors, a second terminal on the loop intermediate of the rectifiers, said first and second terminals thereby permitting the amplifier to be interposed in a circuit in series with a load and a source of alternating current by connections made to said first and second terminals, a third terminal on the loop intermediate of said first rectifier and the one of the reactors next adjacent thereto, a fourth terminal on the loop intermediate of said second rectifier and the other of the reactors, control means for impressing a unidirectional control voltage across said third and fourth terminals, a first circuit means interconnecting said third terminal and a point on said other of the reactors intermediate the ends of said other reactor, and a second circuit means interconnecting said fourth terminal and a point on said one of the reactors intermediate the ends of said one reactor, a rectifier in said first circuit means, poled to permit current to flow from said third terminal to said point on said other of the reactors, a rectifier in said second circuit means poled to permit current flow from said point on said one reactor to said fourth terminal, and presetting means to render said control means operative to impress a voltage of predetermined magnitude across said third and fourth terminals before energization of said circuit by the source for insuring that the flux level in one of said reactors is closer to one end of its hysteresis loop than the flux level in the other reactor is to the corresponding end of its hysteresis loop, and wherein said first and second circuit means are separate from said control means and are operative to overcome the effect of said predetermined control voltage upon energization of said circuit by the source.

6. A magnetic amplifier comprising a pair of saturable reactors each including a winding on a saturable core, means connecting the windings in parallel with each other to define a first circuit having two branches, rectifiers in said branches, respectively, poled to permit alternate half-waves of alternating current to flow through said circuit with half-waves of one polarity flowing in one branch and half-waves of the other polarity flowing in the other branch, a second circuit interconnecting said windings and operative, when a half-wave of current is flowing through one of said branches and causing a flux change in the core associated with said one branch, to permit a current to flow in only a fractional portion of the winding in the other branch, thereby to change the flux in the core associated with said other branch a like amount, a third circuit, separate from the second circuit, interconnecting said windings and operative, when a half-wave of current is flowing through the other of said branches and causing a flux change in the core associated with said other branch, to permit a current to flow in only a fractional portion of the winding in said one branch thereby to change the flux in the core associated with said one branch a like amount, said second and third circuits directly interconnecting said windings so that, when the magnetic amplifier is connected to a load, said currents permitted to flow in said fractional portions of said windings by said second and third circuits also flow through the load, control means for impressing a unidirectional control voltage between said branches, and presetting means to render said control means operative to impress a voltage of predetermined magnitude between said branches before energization of said branches by a source of alternating current.

7. A magnetic amplifier in accordance with claim 6 characterized in that resistors are interposed in said second and third circuit, respectively.

8. A magnetic amplifier in accordance with claim 7 characterized in that rectifiers are interposed in said second and third circuits, respectively, in series with the respective resistors.

9. A magnetic amplifier in accordance with claim 8 characterized in that the resistances of said resistors are adjusted so that neither core saturates as a result of the flow of said alternating current.

References Cited by the Examiner
UNITED STATES PATENTS

| | | | |
|---|---|---|---|
| 2,712,105 | 6/1955 | Mathias | 318—513 |
| 2,786,177 | 3/1957 | Werner | 323—89.1 |
| 2,839,617 | 6/1958 | Davis | 323—89 |
| 2,843,818 | 7/1958 | Mintz | 323—89.1 |
| 2,907,947 | 10/1959 | Steinitz | 323—89.1 |
| 2,970,251 | 1/1961 | Wickerham | 318—207 |

ORIS L. RADER, *Primary Examiner.*
JOHN F. COUCH, *Examiner.*